(12) United States Patent
Frenal

(10) Patent No.: US 10,107,702 B2
(45) Date of Patent: Oct. 23, 2018

(54) PRESSURE SENSOR AND PRESSURIZED FLUID APPARATUS COMPRISING SUCH A SENSOR

(71) Applicant: L'Air Liquide, Société Anonyme pour l'Etude et l'Exploitation des Procédés Georges Claude, Paris (FR)

(72) Inventor: Antoine Frenal, Ezanville (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 15/370,694

(22) Filed: Dec. 6, 2016

(65) Prior Publication Data

US 2017/0160161 A1 Jun. 8, 2017

(30) Foreign Application Priority Data

Dec. 8, 2015 (FR) ..................................... 15 62005

(51) Int. Cl.
*G01L 19/14* (2006.01)
*G01L 19/00* (2006.01)

(52) U.S. Cl.
CPC ........ *G01L 19/147* (2013.01); *G01L 19/0069* (2013.01); *G01L 19/142* (2013.01)

(58) Field of Classification Search
CPC .............. G01L 9/0073; G01L 19/0645; G01L 2224/48091; G01L 19/0038; G01L 19/143; G01L 2224/48227; G01L 2924/00014; G01L 9/0075; G01L 19/0007; G01L 19/14; G01L 19/147; G01L 19/0069

USPC ........................... 73/708, 756, 715, 723, 753
See application file for complete search history.

(56) References Cited

U.S. PATENT DOCUMENTS

| 5,535,629 | A | * | 7/1996 | Gerdes | .................. | G01L 9/0075 |
| | | | | | | 73/715 |
| 6,311,561 | B1 | * | 11/2001 | Bang | ..................... | G01L 9/0073 |
| | | | | | | 73/708 |
| 2002/0062697 | A1 | * | 5/2002 | Yamagishi | .......... | G01L 19/0084 |
| | | | | | | 73/715 |
| 2005/0087020 | A1 | * | 4/2005 | Ueyanagi | ............ | G01L 19/0084 |
| | | | | | | 73/753 |

FOREIGN PATENT DOCUMENTS

| EP | 0 488 446 | 6/1992 |
| FR | 2 901 876 | 12/2007 |
| WO | WO 00 45143 | 8/2000 |

OTHER PUBLICATIONS

French Search Report and Written Opinion for corresponding FR 1562005, dated Aug. 18, 2016.

* cited by examiner

*Primary Examiner* — Harshad R Patel
*Assistant Examiner* — Brandi Hopkins
(74) *Attorney, Agent, or Firm* — Elwood L. Haynes

(57) ABSTRACT

Pressure sensor having a support element extending in a longitudinal direction and bearing a pressure-sensitive element, the sensor having a threaded portion for mounting the sensor in a threaded housing in a pressurized fluid apparatus, the support element having a shoulder forming an abutment surface that is not parallel to the longitudinal axis, to allow the sensor to be positioned in a predetermined position in a direction parallel to the longitudinal direction, wherein the threaded portion is formed on a tightening nut which is separate and movable with respect to the support element.

6 Claims, 2 Drawing Sheets

PRESSURE SENSOR AND PRESSURIZED FLUID APPARATUS COMPRISING SUCH A SENSOR

CROSS REFERENCE TO RELATED APPLICATIONS

This application claims the benefit of priority under 35 U.S.C. § 119 (a) and (b) to French Patent Application No. 1562005 filed Dec. 8, 2015, the entire contents of which are incorporated herein by reference.

BACKGROUND

Pressure sensors generally comprise an insert provided with a pressure-sensitive element (piezoelectric, for example) which is screwed into the body of the apparatus where pressure measurement is to be performed.

FR2901876A1 describes an example of a pressure sensor structure for a device for indicating a physical quantity.

In certain configurations, the depth of insertion of a pressure sensor must be precisely indexed, for example for integration purposes and/or to allow the sensor to occupy a predetermined position with respect to an electrical member that may be electrically connected to said sensor.

In addition, depending on the configuration of the sensor or the environment in which it is located, in the assembled position, the angular position of the sensor (around the direction in which it is pushed in depthwise) may also constitute a considerable constraint in terms of mounting.

Prior art devices do not provide a satisfactory solution to either of these constraints.

SUMMARY

The invention relates to a pressure sensor and a pressurized fluid apparatus comprising such a sensor.

More particularly, the invention relates to a pressure sensor comprising a support means extending in a longitudinal direction and bearing a pressure-sensitive element, the sensor comprising a threaded portion for mounting the sensor in a threaded housing in a pressurized fluid apparatus, the support means comprising a shoulder forming an abutment surface that is not parallel to the longitudinal axis, to allow said sensor to be positioned in a predetermined position in a direction parallel to the longitudinal direction.

The invention relates in particular to a sensor structure and the integration thereof in an apparatus such as a pressurized fluid valve.

It is an aim of the present invention to overcome all or part of the abovementioned disadvantages found in the prior art.

To this end, the sensor according to the invention, which moreover complies with the general definition given in the preamble above, is essentially characterized in that the threaded portion is formed on a tightening nut which is separate and movable with respect to the support means.

Furthermore, embodiments of the invention may comprise one or more of the following features:

the nut has a tubular shape and comprises a threaded outer surface (4) and a downstream end for interacting directly or indirectly with the support means to transmit a pushing force to said support means (3) in the longitudinal direction, the nut 6 and the support means are arranged concentrically around the longitudinal axis, the nut comprises an upstream end for gripping, which a user may manipulate so as to mount the sensor in a housing of a pressurized fluid apparatus, and the upstream gripping end is connected to the rest of the nut via a weakened zone and/or breakable zone designed to cause the upstream gripping end to break off from the rest of the nut once a predetermined tightening torque, for example between 20 and 40 N, is exceeded, the sensor includes a peg for indexing the sensor in a predetermined angular position around the longitudinal axis, the peg is mounted removably in a housing or passage in the support means, the peg protrudes with respect to the shoulder, the sensor is electric or electronic, that is to say the pressure-sensitive element generates an electrical signal representative of the pressure measured, the support means comprising an upstream end with electric contact(s) connected to the sensitive element, for interacting with an electrical connection member in order to transmit said electrical signal and, if necessary, receive a signal, the sensor comprises an electrical connection plug mounted on said support means to accommodate electrical connection elements for interacting with the contact or contacts of the sensor, the nut and the connection plug are mounted concentrically around the longitudinal axis, the peg extends in a direction parallel to the longitudinal axis, the nut is mounted concentrically around the connection plug around the longitudinal axis and holds this plug against the support means in the direction of the longitudinal axis.

The invention also relates to a pressurized fluid apparatus, in particular a pressurized fluid valve, comprising a body housing a pressurized fluid circuit and a pressure sensor for measuring the pressure in said circuit, the pressure sensor being in accordance with any one of the features stated above or below.

The invention may also relate to any alternative device or method comprising any combination of the features stated above or below.

BRIEF DESCRIPTION OF THE DRAWINGS

Other features and advantages will become apparent on reading the description below, provided with reference to the figures in which.

DESCRIPTION OF PREFERRED EMBODIMENTS

Figure 1:
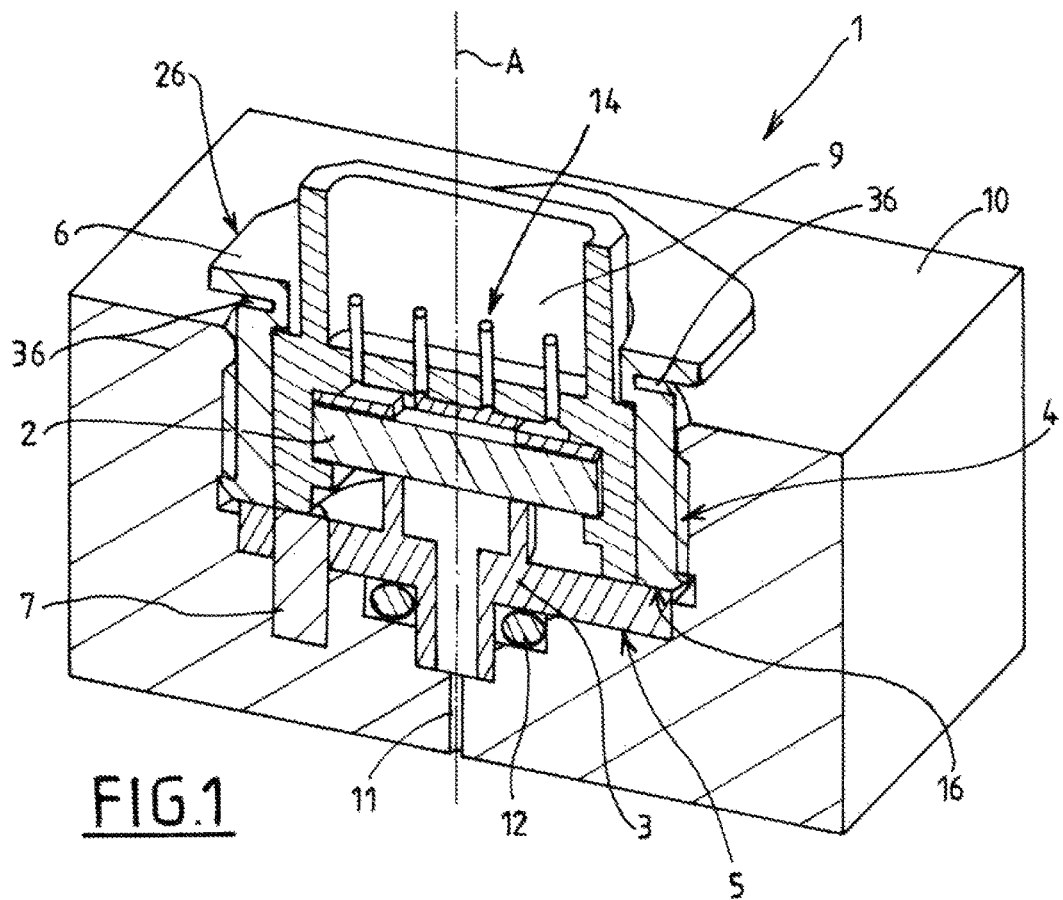
FIG. 1 shows a partial schematic perspective view in section of a pressure sensor integrated in a pressurized fluid apparatus.

FIG. 1 shows a pressure sensor 1 integrated in a pressurized fluid apparatus 10. For example, the sensor 1 is a pressure sensor for measuring the pressure of a gas in a pressurized gas circuit 11 of a pressurized fluid apparatus 10 of (a) pressurized fluid cylinder(s) (see also FIG. 3).

The sensor 1 comprises a support means 3 extending in a longitudinal direction A and bearing an element 2 that is sensitive to pressure.

The support means 3 and/or the sensitive element 2 is for example made of metal or any other suitable material.

The pressure-sensitive element 2 comprises, for example, a piezoelectric (or other type of) element generating an electrical signal representative of the pressure measured. This sensitive element 2 may be welded to the support means 3.

The sensor 1 comprises a portion 4 which is threaded (or equivalent, for example with a bayonet and/or snap-fastening or other fitting means) for mounting the sensor 1 in a corresponding (threaded or grooved) housing in a pressurized fluid apparatus 10.

To enable precise positioning of the sensor 1 in a direction parallel to the longitudinal axis A of the sensor 1 (depthwise), the support means 3 comprises a shoulder 5 forming an abutment surface which is not parallel to the longitudinal axis A. For example, this abutment 5 is perpendicular to the longitudinal axis A. This abutment 5 is for example defined by the downstream face of a disc-shaped portion delimited by the support means 3. For the purposes of the description, the upstream and downstream ends of the sensor are defined in the longitudinal direction A towards the outside and towards the inside of the apparatus in which it is mounted, respectively.

Furthermore, the threaded portion 4 is located on a tightening nut 6 which is separate and movable with respect to the support means 3. In this way, the positioning in terms of depth (in the longitudinal direction A) of the support means 3 is perfectly defined, irrespective of the degree of tightening of the threaded part 4.

In particular, the downstream face of the shoulder 5 comes into contact with a reference surface of the body of the apparatus 10 which receives the sensor. The tightening nut 6 (which is, for example, a part which is separate from the support means 3), when tightened in the body of the apparatus, holds the support means 3 in its predetermined position in a direction parallel to the longitudinal axis.

The downstream end of the support means 3 may have an O-ring seal 12 that interacts with the housing in order to ensure a seal between the interior (under pressure) and the exterior (with respect to the internal channel 11).

As shown, the nut 6 may have a tubular shape with a threaded outer surface 4. Depending on the tightening of the nut 6 in the housing, a downstream end 16 of the nut may interact directly with the support means 3 to transmit a pushing force (in the downstream direction) on the support means 3 in the longitudinal direction A. The nut 6 thus may be used to immobilize the support means 3 longitudinally against the reference surface thereof. The screwing of the nut 6 has no impact on the depthwise position of the sensor (support means 3 and sensitive element).

As shown in the figures, the nut 6 and the support means 3 may be arranged concentrically around the longitudinal axis A, for example at least a portion of the support means 3 is accommodated within the internal volume of the nut 6.

As shown schematically in FIG. 1, the nut 6 comprises an upstream end 26 for gripping, for example several-sided, which a user may manipulate so as to mount (screw in/unscrew) the sensor 1 in the housing of a pressurized fluid apparatus.

In an optional alternative embodiment, said upstream gripping end 26 may be connected to the rest of the nut 6 via a weakened zone and/or breakable zone 36 designed to cause the upstream gripping end 26 to break off from the rest of the nut 6 once a predetermined tightening torque, for example between 20 and 40 Newtons, is exceeded.

In other words, when the sensor 1 is mounted (screwed) in the body, by exceeding a certain tightening torque, the user can break this upstream end 26 off the nut 6. There is no longer any (or only a little) part of the sensor 1 left that may be gripped to remove it, to prevent it from being accidentally or unduly removed. For example, the separable upstream end 26 is the part of the nut 6 which protrudes with respect to the surface of the apparatus 10 around the housing that receives the sensor 1.

If the angular position of the sensor 1 in the apparatus 10 around the longitudinal axis A thereof is important, the sensor 1 may also include a peg 7 for indexing the sensor in a predetermined angular position around the longitudinal axis A. This may be necessary in particular in the case where the upstream end of the sensor (in particular the support means 3) has electrical and/or mechanical members with a particular orientation for interacting with corresponding members of a separate part that may be removably connected to the sensor.

As shown in FIG. 1, an angular indexing peg 7 may be mounted, removably or otherwise, in a housing or passage in the support means 3 so as to interact with a corresponding recess made in the apparatus. For example, the peg 7 protrudes with respect to the shoulder in a direction parallel to the longitudinal axis A.

In this way, the support means 3 is also immobilized in terms of rotation in a predetermined position around the longitudinal axis A.

Thus, the indexing in terms of depth (along the axis A) and, where applicable, in terms of rotation (around said axis A) may be dissociated and made independent of the tightening force for screwing the sensor 1 into the housing. The screwing of the nut 6 in fact has no effect on the angular position of the sensor.

Figure 2:
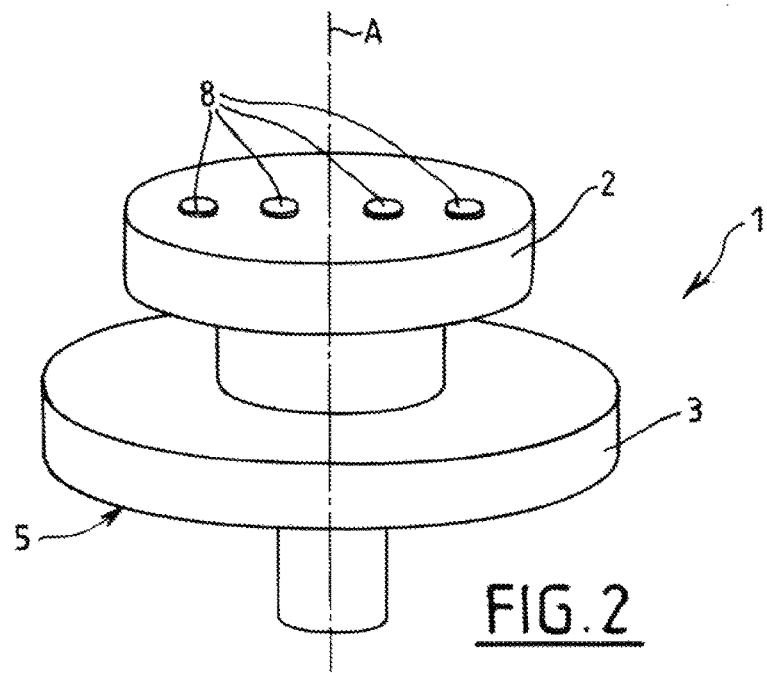
FIG. 2 shows a partial schematic perspective view of a detail of the device of FIG. 1, illustrating a sensor support means.

To eliminate the need for precise angular indexing (in terms of rotation) of the contacts 8 around the axis A, the individual contact(s) 8 of FIG. 2 could be replaced by concentric circular tracks arranged around the axis A. In this way, the connection with individual connection elements 14 may be made whatever the angular position of the contacts 8 with respect to the individual elements 14.

The sensor 1 may be electric or electronic, that is to say the pressure-sensitive element 2 generates an electrical signal representative of the pressure measured. The support means 3 may comprise an upstream end with discrete or continuous electric contact(s) 8 (see FIG. 2) for interacting with an electrical connection member (via connecting elements 14) in order to transmit said signal and, if necessary, receive a signal (for example to configure or calibrate said sensor).

To this end, the sensor may comprise an electrical connection plug 9 mounted on said support means 3 to accommodate electrical connection elements 14 for interacting with the contact or contacts 8 of the sensor 1. In other words, the plug 9 may include a housing for accommodating an electrical connection member 13 which is removably connected to the track or contact(s) 8 (see FIG. 3).

As shown in FIG. 1, the plug 9 then the nut 6 may be mounted concentrically on and around the support means 3, concentrically to the longitudinal axis A.

This arrangement results in a very compact pressure sensor with great mechanical strength and good sealing.

Figure 3:
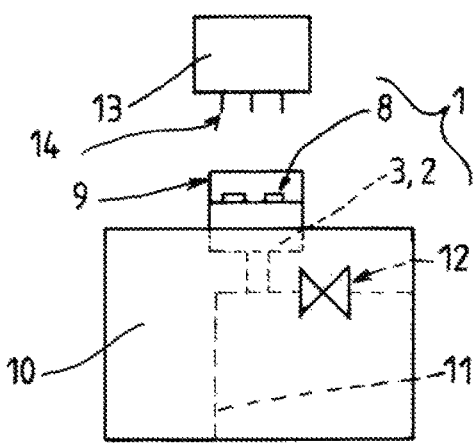
FIG. 3 shows a partial schematic view in section of another example of the integration of a pressure sensor in a pressurized fluid apparatus.
Figure 4:
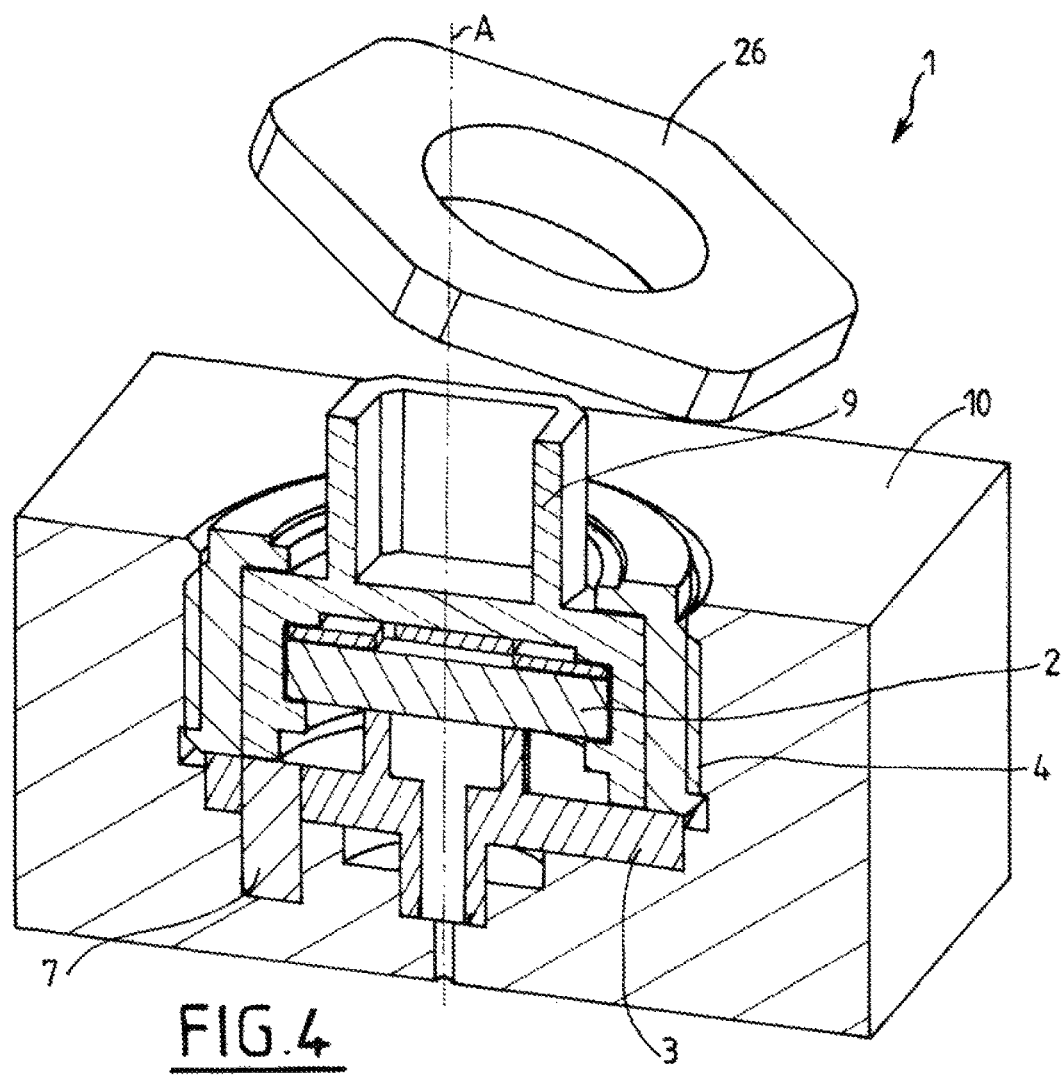
FIG. 4 shows a view of a pressure sensor integrated in a pressurized fluid apparatus similar to that of FIG. 1 in which a mounting portion of the sensor is detached after the sensor is mounted on the apparatus which receives it.

Merely as an example, the sensor 1 may be integrated in a pressurized fluid apparatus such as a pressurized fluid valve comprising a body housing a pressurized fluid circuit 11. As shown in FIG. 3, the pressurized fluid apparatus 10 may comprise at least one pressure relief device and/or pressure regulator 12 in the circuit and the sensor 1 is configured to measure the pressure in the circuit 11, for example to measure the pressure in a part of the circuit which is in communication with a gas container to which the pressurized fluid apparatus 10 is connected.

The information measured by the pressure sensor 1 may be transferred to a module 13 that may be detachably connected to the sensor 1 (at the contacts). The module includes, for example, an electronic processing logic, in particular for processing the pressure signals measured by the sensor 1. The module may also include wireless communication devices.

The architecture makes it possible to precisely position the sensor depthwise in the body of a pressurized fluid apparatus 10 (along the longitudinal axis A) and, where applicable, also around said longitudinal axis.

This makes it possible, in particular, to create a reference position for the sensor so that it works seamlessly with the elements surrounding it, in particular in the case where an electrical or other type of element must be connected to said sensor 1.

The invention claimed is:

1. A pressure sensor for use in a body of a pressurized fluid apparatus, the body comprising a longitudinal axis in a depthwise direction and an outside, the pressure sensor comprising, a support element extending along the direction of the longitudinal axis and a shoulder forming an abutment surface which is not parallel to the longitudinal axis, the support element bearing in the longitudinal direction toward the outside of the body of the pressurized fluid apparatus and in direct contact with a pressure-sensitive element, a threaded portion for mounting the sensor in a threaded housing in a pressurized fluid apparatus, the pressure sensor configured to be precisely positioned in a predetermined position depthwise in the pressurized fluid apparatus body, in a direction parallel to the longitudinal direction, wherein the threaded portion is formed on a tightening nut which is separate and movable with respect to the support means.

2. The sensor of claim 1, wherein the tightening nut has a tubular shape and comprises a threaded outer surface and a downstream end for interacting directly or indirectly with the support means to transmit a pushing force to said support means in the longitudinal direction.

3. The sensor of claim 1, wherein the nut and the support means are arranged concentrically around the longitudinal axis.

4. The sensor of claim 1, further comprising a peg for indexing the sensor in a predetermined angular position around the longitudinal axis.

5. The sensor of claim 4, wherein the peg is mounted removably in a housing or passage in the support means.

6. The sensor of claim 4, wherein the peg protrudes with respect to the shoulder.

* * * * *